2,784,217

PURIFICATION OF ACRYLONITRILE

Robert L. Maute, Texas City, Tex., assignor to Monsanto Chemical Company, St. Louis, Mo., a corporation of Delaware No Drawing. Application December 31, 1954, Serial No. 479,225

12 Claims. (Cl. 260—465.9)

This invention relates to acrylonitrile and more specifically to a process for its purification.

Acrylonitrile is a well known article of commerce and is widely used in the preparation of various types of synthetic resins and fibers. It is also a valuable intermediate in the preparation of other organic compounds. In most applications, particularly when used in the preparation of synthetic resins or fibers, it is necessary that acrylonitrile of exceptional purity be used. Most of the processes used for the preparation of acrylonitrile simultaneously produce, in addition to acrylonitrile, minor amounts of carbonyl-containing compounds, particularly methyl vinyl ketone. Acrylonitrile containing minor quantities of methyl vinyl ketone is most unsatisfactory for many applications.

It is an object of this invention to provide a process for the purification of acrylonitrile.

It is a particular object of this invention to provide a process for the removal of minor amounts of methyl vinyl ketone from acrylonitrile.

Additional objects will become apparent from the description of the process of this invention.

It has now been discovered that minor amounts of methyl vinyl ketone can be removed from acrylonitrile by treating acrylonitrile containing methyl vinyl ketone with a minor amount of a compound chosen from the group consisting of phenylhydrazine and 2,4-dinitrophenylhydrazine in the presence of a mineral acid in an amount sufficient to maintain the reaction mixture at a pH of less than 7.

The treatment can be carried out in any convenient manner such as by merely vigorously mixing phenylhydrazine or 2,4-dinitrophenylhydrazine and the mineral acid with acrylonitrile. Temperatures in the range of from about 0° C. to about 78° C., the boiling point of acrylonitrile, can be employed. The reaction is best carried out at elevated temperatures and preferably by boiling under reflux conditions a mixture of acrylonitrile, a minor amount of phenylhydrazine or 2,4-dinitrophenylhydrazine and enough mineral acid to maintain the reaction mixture at a pH of less than 7.

Any of the mineral acids, such as hydrochloric, sulfuric and phosphoric acids can be used.

The amount of phenylhydrazine or 2,4-dinitrophenylhydrazine used can be varied substantially and it is preferably employed in excess up to twenty-fold of that required to react with the methyl vinyl ketone contained in the acrylonitrile. After treatment, substantially pure acrylonitrile can be recovered in any convenient manner. Distillation of acrylonitrile from the reaction mixture affords an economical and convenient method of recovery.

The following examples illustrate the novel process of this invention:

*Example I*

To approximately 800 grams of acrylonitrile containing 700 parts by weight of methyl vinyl ketone per million parts by weight of acrylonitrile, was added 1% by weight of the total composition of 2,4-dinitrophenylhydrazine and 10 ml. of concentrated (36%) hydrochloric acid. The mixture was placed in a suitable flask and attached to a reflux column and boiled under reflux conditions at a temperature of approximately 78° C. for approximately 5 hours. Acrylonitrile was then flash-distilled from the reaction mixture. Polarographic analysis indicated the absence of any methyl vinyl ketone in the thus-purified acrylonitrile.

*Example II*

A solution of 1 g. of phenylhydrazine in 100 ml. of 2 N hydrochloric acid was added, at room temperature, to a 100-g. sample of acrylonitrile containing 500 parts by weight of methyl vinyl ketone per million parts by weight of acrylonitrile (p. p. m.) and the mixture was shaken vigorously for one minute. The layers formed after settling were then separated and the acrylonitrile layer was distilled and analyzed. Polarographic analysis of the treated acrylonitrile indicated a methyl vinyl ketone content of only 140 p. p. m.

What is claimed is:

1. A process for the purification of acrylonitrile containing methyl vinyl ketone which comprises treating said acrylonitrile with a minor amount of a compound chosen from the group consisting of phenylhydrazine and 2,4-dinitrophenylhydrazine in the presence of a mineral acid in an amount sufficient to maintain the reaction mixture at a pH of less than 7.

2. A process for the purification of acrylonitrile containing methyl vinyl ketone which comprises treating said acrylonitrile at an elevated temperature with a minor amount of a compound chosen from the group consisting of phenylhydrazine and 2,4-dinitrophenylhydrazine in the presence of a mineral acid in an amount sufficient to maintain the reaction mixture at a pH of less than 7.

3. A process for the purification of acrylonitrile containing methyl vinyl ketone which comprises boiling under reflux conditions a mixture comprising said acrylonitrile, a minor amount of a compound chosen from the group consisting of phenylhydrazine and 2,4-dinitrophenylhydrazine and a mineral acid in an amount sufficient to maintain the reaction mixture at a pH of less than 7.

4. The process as described in claim 3 wherein the mineral acid is hydrochloric acid.

5. A process for the purification of acrylonitrile containing methyl vinyl ketone which comprises treating said acrylonitrile with a minor amount of phenylhydrazine in the presence of a mineral acid in an amount sufficient to maintain the reaction mixture at a pH of less than 7.

6. A process for the purification of acrylonitrile containing methyl vinyl ketone which comprises treating said acrylonitrile at an elevated temperature with a minor amount of phenylhydrazine in the presence of a mineral acid in an amount sufficient to maintain the reaction mixture at a pH of less than 7.

7. A process for the purification of acrylonitrile containing methyl vinyl ketone which comprises boiling under reflux conditions a mixture comprising said acrylonitrile, a minor amount of phenylhydrazine, and a mineral acid in an amount sufficient to maintain the reaction mixture at a pH of less than 7.

8. The process of claim 7 wherein the mineral acid is hydrochloric acid.

9. A process for the purification of acrylonitrile containing methyl vinyl ketone which comprises treating said acrylonitrile with a minor amount of 2,4-dinitrophenylhydrazine in the presence of a mineral acid in an amount sufficient to maintain the reaction mixture at a pH of less than 7.

10. A process for the purification of acrylonitrile containing methyl vinyl ketone which comprises treating said acrylonitrile at an elevated temperature with a minor amount of 2,4-dinitrophenylhydrazine in the presence of a mineral acid in an amount sufficient to maintain the reaction mixture at a pH of less than 7.

11. A process for the purification of acrylonitrile containing methyl vinyl ketone which comprises boiling under reflux conditions a mixture comprising said acrylonitrile, a minor amount of 2,4-dinitrophenylhydrazine, and a mineral acid in an amount sufficient to maintain the reaction mixture at a pH of less than 7.

12. The process of claim 11 wherein the mineral acid is hydrochloric acid.

References Cited in the file of this patent

UNITED STATES PATENTS

| | | |
|---|---|---|
| 625,108 | Hewitt | May 16, 1899 |
| 1,892,972 | Urbain | Jan. 3, 1933 |
| 2,494,087 | Daniels | Jan. 10, 1950 |
| 2,678,945 | Taylor | May 18, 1954 |